N. N. MATTHEWS.
TRACTOR LUG.
APPLICATION FILED MAY 8, 1920.
1,406,749. Patented Feb. 14, 1922.
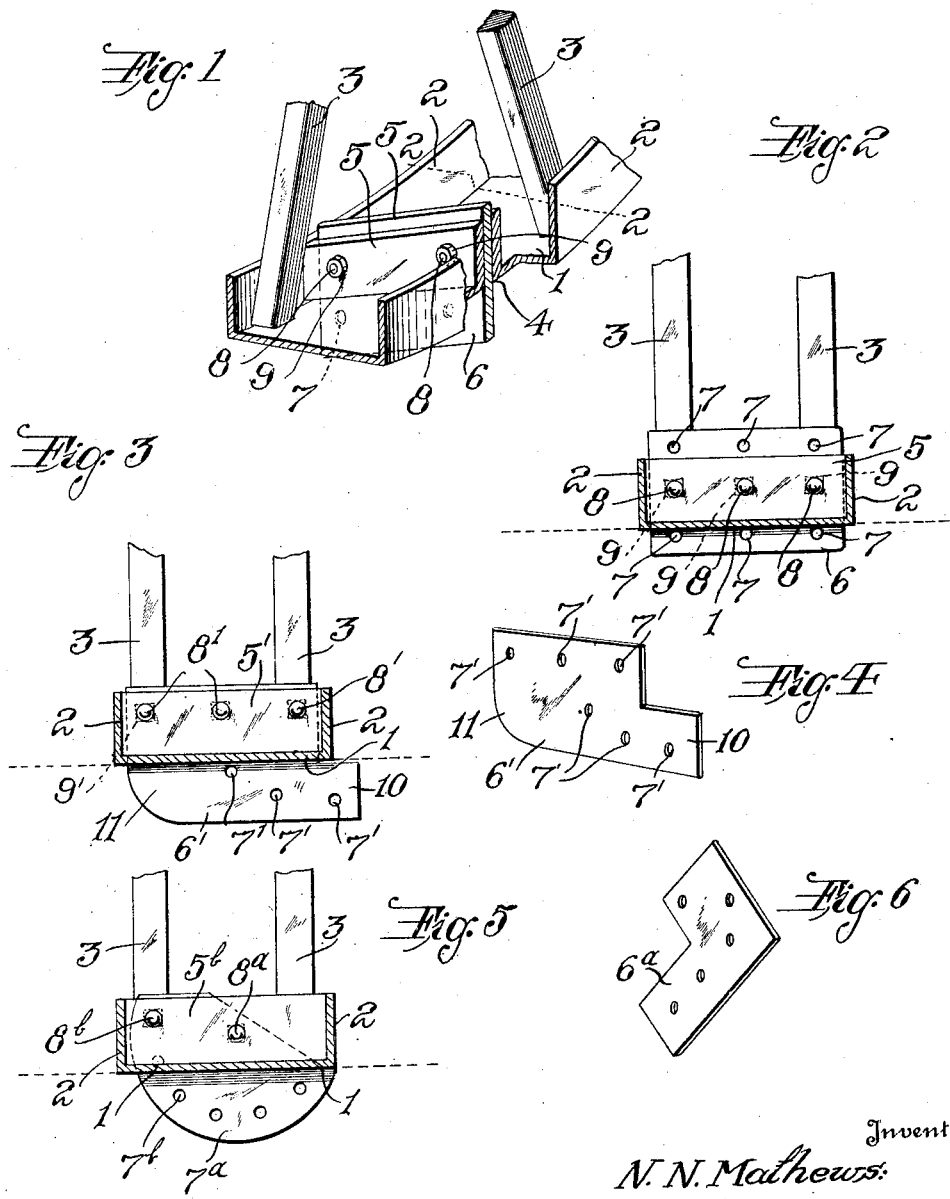

UNITED STATES PATENT OFFICE.

NEWTON NEWELL MATTHEWS, OF BERLIN, MARYLAND.

TRACTOR LUG.

1,406,749.  Specification of Letters Patent.  Patented Feb. 14, 1922.

Application filed May 8, 1920. Serial No. 379,866.

*To all whom it may concern:*

Be it known that I, NEWTON NEWELL MATTHEWS, a citizen of the United States, residing at Berlin, in the county of Worcester and State of Maryland, have invented certain new and useful Improvements in Tractor Lugs; and I do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

The object of my invention is to provide an adjustable traction lug for the driving wheels of a tractor.

A further object is to provide an adjustable traction lug which shall be simple in construction, and in which simple means are combined with the wheel for supporting said lug in an adjusted position.

The accompanying drawing clearly discloses different forms of lugs which may be used, and discloses also one form of supporting means for said lugs, which means function also to strengthen the wheel, in connection with which said lugs are used. It is to be understood that the forms of lugs shown in the drawing are examples of many forms that may be used, as desired, and while I have shown my preferred means for supporting said lugs and strengthening the wheel in connection with which they are used, yet I do not confine myself thereto.

Briefly describing the drawings:

Figure 1 is a fragmentary sectional view, in perspective, of a portion of the rim of a tractor wheel equipped with one form of adjustable tractor lug.

Figure 2 is a transverse sectional view along the line 2—2 of Figure 1.

Figure 3 is a view similar to Figure 2, disclosing a still different form of adjustable lug.

Figure 4 is a detached detail view, in perspective, of the form of lug shown in Figure 3.

Figure 5 is a view similar to Figure 3, showing a still further modified form of lug, and Figure 6 is a detached detail view, in perspective, of another form of lug.

Referring now in detail to the drawings, and first to Figures 1 and 2 thereof:

1 designates the rim of one of the rear or tractor wheels of a tractor, said rim being provided with the conventional side marginal flanges 2, 2. 3 designates the spokes of the wheel.

The rim 1 of the wheel is transversely slotted, as shown at 4, said slot being preferably inclined, as shown in Figure 1.

Adjacent the slot 4, the rim is provided with spaced plates 5, 5 extending transversely of the the rim, and secured thereto in any suitable manner, as by being welded. Said plates 5 function to strengthen the rim, which is weakened by the slot 4, and also to support an adjustable tractor lug 6, which, as shown, is disposed between said plates, and is adapted to project beyond the perimeter of the rim, or to be withdrawn so as to be flush with said rim. In the form of adjustable lug 6, shown in Figure 1, the lug is preferably rectangular and is provided with apertures 7, adapted to be engaged by bolts 8, carrying nuts 9. The bolts pass through apertures in the plates 5, 5 and thus hold the lug 6 in an adjusted position.

Referring now in detail to Figures 3 and 4:

The form of lug 6' herein shown slightly differs from that of the preceding figures, in that it is provided with a lateral toe 10 and a curvilinear edge 11 at the end of said lug opposite the toe 10. The lug is provided with a series of apertures 7', disposed as shown. Securing bolts 8' are adapted to hold the lug in adjusted position, said bolts passing through openings in the plates 5'.

In operation, it will be seen that, by removing the central bolt 8' and the one at the curvilinear end, the lug may be swung on the arc of a circle with the bolt 8' at the toe end of the lug as a pivot. When adjusted to position, the lug is secured by replacing bolts 8'.

Referring now to Figure 5:

The lug 7ª herein shown is segmental in shape, and is provided with a curved series of bolt-holes 7ᵇ. The bolt 8ª constitutes a pivot on which the segmental lug 7ª may be swung, and the bolt 8ᵇ is adapted to secure the lug in adjusted position after being swung on the pivot 8ᵃ. 5ᵇ designates the plates which are similar to the corresponding plates in the other views of the drawing.

Referring now in detail to Figure 6:

The lug 6ᵃ, herein shown, is substantially the same as that shown in Figure 3, excepting that the curved edge 11 of the lug in Figure 3 is omitted, the lug 6ᵃ being formed as an angle plate.

It is to be understood that while in Figure 1 I have shown but one lug 6, and one slot 4, there are a plurality of such lugs and slots, preferably equidistantly spaced on the rim 1, there being provided, of course, a corresponding number of plates 5, two plates for each slot and each lug.

What I claim to be new is:

1. The combination with a tractor wheel provided with a rim having a transverse slot, plates carried by said rim adjacent said slot, and an adjustable traction lug disposed between said plates and adapted to project through said slot, and means for securing said traction lug to said plates.

2. The combination with a tractor wheel having a rim provided with a transversely extending slot, plates disposed adjacent said slot, and a traction lug adjustably positioned between said plates and adapted to project through said slot.

3. The combination of a tractor wheel provided with a rim having a transversely extending slot, transversely extending plates carried by said rim adjacent said slot, a traction lug disposed between said plates and adapted to project through said slot, and securing means passing through said plates and said lug for adjustably securing the latter in position.

In testimony whereof I hereunto affix my signature.

NEWTON NEWELL MATTHEWS